United States Patent

[11] 3,619,417

| [72] | Inventor | Marc J. Sims<br>San Francisco, Calif. |
|---|---|---|
| [21] | Appl. No. | 854,275 |
| [22] | Filed | Aug. 29, 1969 |
| [45] | Patented | Nov. 9, 1971 |
| [73] | Assignee | Chevron Research Company<br>San Francisco, Calif. |

[54] SPLIT FEED HYDRODENITRIFICATION
5 Claims, No Drawings

[52] U.S. Cl. .................................................. 208/254 H
[51] Int. Cl. .................................................... C10g 23/00
[50] Field of Search ........................................ 208/254, 218

[56] References Cited
UNITED STATES PATENTS

| 2,894,903 | 7/1959 | McGrath et al. | 208/254 H |
| 2,938,857 | 5/1960 | Johnson et al. | 208/254 H |
| 3,291,751 | 12/1966 | Buss | 208/254 H |
| 3,294,673 | 12/1966 | Peck et al. | 208/254 H |
| 3,306,845 | 2/1967 | Poll | 208/254 H |
| 3,425,934 | 2/1969 | Jacobson et al. | 208/254 H |

*Primary Examiner* — Delbert E. Gantz
*Assistant Examiner* — G. J. Crasanakis
*Attorneys* — A. L. Snow, F. E. Johnston, C. J. Tonkin and T. G. De Jonghe ABSTRACT: In a split feed hydrodenitrification process, the improvement is made which comprises:

a. maintaining the L.H.S.V. in the heavy oil conversion zone at less than 75 percent of the L.H.S.V. in the light oil conversion zone;

b. maintaining the inlet temperature to the heavy oil conversion zone at least 25° F. below the inlet temperature in the light oil conversion zone; and c. reducing the organic nitrogen content to an average of less than 50 p.p.m. on a nitrogen weight basis for the light oil and heavy oil hydrodenitrified fractions.

SPLIT FEED HYDRODENITRIFICATION

BACKGROUND OF THE INVENTION

1. The Field of the Invention

The present invention relates to a hydrocarbon conversion process, and, more particularly, to a hydrocarbon conversion process for converting hydrocarbon feedstocks into more valuable products. Still more particularly, the present invention relates to a catalytic hydrodenitrification process.

2. Description of the Prior Art

Nitrogen-containing compounds are deleterious in certain refining processes, such as the cracking and hydrocracking processes, because of their poisonous effect on the catalysts. It is also speculated that nitrogen-containing compounds contribute to discoloration, formation of sludges and gum, and general instability of petroleum products. Thus, it is frequently desired to purify hydrocarbon oils derived from crude petroleum and similar hydrocarbonaceous materials, especially to remove nitrogen compounds. For example, catalytic hydrorefining is used to prepare naphtha for reforming with catalysts the activities of which are adversely affected by nitrogen compounds. Also, for example, catalytic hydrorefining is used to prepare gas oils for hydrocracking, to prepare residual or deasphalted residua for catalytic cracking, and to prepare improved lubricating oils.

The catalytic hydrorefining processes may be carried out in a variety of manners adapted to effect intimate contacting of oil, hydrogen, and a solid catalyst in reaction zone, by passing the oil and hydrogen together or countercurrently through beds of catalysts particles, or by passing the oil and hydrogen through a zone wherein they contact downwardly gravitating catalyst particles, suspended catalyst particles, or fluidized catalyst particles. Conditions employed in the reaction zone include temperatures of 500° to 900° F., pressures above 200 p.s.i.g., hydrogen to oil ratios of 100 to 20,000 s.c.f. per barrel, and contact times between catalyst and oil expressed in liquid volumes of oil per hour per volume of catalyst of 0.1 to 10 L.H.S.V. Sulfactive hydrogenation catalysts are used, comprising Group VI metals and/or Group VIII metals, their oxides or sulfides, usually associated with a porous refractory oxide carrier or support.

U.S.P. 3,306,845 is directed to a process for hydrodenitrification of a hydrocarbon feedstock wherein the hydrocarbon feedstock is split into a naphtha, a diesel and a gas oil fraction. The process of U.S.P. 3,306,845 includes the following steps:

1. Subjecting a nitrogen-containing raw gas oil feedstock to catalytic hydrofining under relatively mild conditions;
2. Fractionating the effluent from Step 1 to recover a partially refined gas oil product, a lower boiling partially refined synthetic diesel fraction, and a still lower boiling partially refined synthetic naphtha fraction;
3. subjecting a nitrogen-containing raw diesel feedstock to catalytic hydrofining in a separate hydrofining zone along with said synthetic diesel fraction, under relatively more severe conditions than were employed in Step 1;
4. Fractionating the effluent from Step 3 to recover a diesel product fraction of lower nitrogen content than gas oil product, and a lower-boiling, partially refined synthetic naphtha fraction;
5. Subjecting a nitrogen-containing raw naphtha feedstock to catalytic hydrofining in a separate hydrofining zone along with said synthetic naphtha feed fractions from Steps 2 and 4 under relatively more severe conditions than were employed in Step 3; and
6. Recovering a substantially nitrogen-free naphtha product fraction from the effluent from Step 5.

Thus, according to the process of U.S.P. 3,306,845, more severe reaction conditions are used for hydrodenitrification of lighter feeds and less severe conditions for heavier feeds. In general, the more severe conditions for lighter feeds require a lower space velocity (and thus a greater residence time over the catalyst for reaction) and a higher operating temperature. The example presented in U.S.P. 3,306,845 in general shows a lower space velocity for lighter feeds than for heavy feeds, and a higher temperature for lighter feeds than for heavier feeds. Thus the space velocity for both naphtha hydrofining and diesel hydrofining is less that the space velocity for gas oil hydrofining, according to the example of U.S.P. 3,306,845. The space velocity for diesel hydrofining would be expected to be lower than that used for naphtha hydrofining, in accordance with the teaching of U.S.P. 3,306,845, but in the example the diesel hydrofining uses a lower space velocity than the the naphtha hydrofining. This is apparently because the diesel hydrofiner had a particularly high nitrogen-content feed. According to the example in U.S.P. 3,306,845, the nitrogen content of the naphtha is reduced to about 0.8 p.p.m. and the nitrogen content of the diesel is reduced to about 137 p.p.m., for an average of about 60 p.p.m. for the naphtha plus diesel fractions.

U.S.P. 3,365,391 is directed to split-feed hydrodenitrification wherein a higher hydrogen partial pressure is used in the hydrodenitrification of a high boiling heavy gas oil, and a lower hydrogen pressure is used in the hydrodenitrification of a lower-boiling light gas oil. As is disclosed in a number of other literature references, a lower space velocity is used for the hydrodenitrification of the more refractory heavy gas oil, as opposed to the light refractory gas oil. According to U.S.P. 3,365,391 suitable process conditions for the respective hydrofining units are between 600° and 850° F. According to example 1 in U.S.P. 3,365,391, the higher pressure hydrofiner used to process the heavy gas oil operates at a higher temperature (730° F.) than the low-pressure hydrofiner (720° F.) used to process the light gas oil.

U.S.P. 2,938,857 is also directed to split-feed hydrodenitrification. According to the process of U.S.P. 2,938,857 a crude petroleum is fractionated into a distillate fraction and a residual fraction. The distillate fraction is hydrofined by contact with a 4–10 mesh size catalyst, and the residual fraction is hydrofined by contact in a separate zone with 8–14 mesh catalyst. According to the disclosure of U.S.P. 2,938,857, the space rate for hydrodenitrification of the residual fraction is generally lower than the space rate for the distillate fraction, with preferred space rates for the residual fraction being within the approximate range from 0.5 to 2, and for the distillate fraction within the approximate range of 1 to 6. U.S.P. 2,938,857 indicates that preferred temperatures in the case of the residual fraction are higher than those for the distillate fraction, with the preferred temperatures in the case of the residual fraction being within the approximate range of 750° and 850° F. and for the distillate fraction within the approximate range 700° to 800° F.

Thus it is seen that both U.S.P. 3,306,845 and U.S.P. 2,938,857 disclose and teach the use of somewhat higher temperature for the split-flow hydrodenitrification zone used to process the heavy oil and a somewhat lower temperature for the hydrodenitrification zone used to process the lighter, or lower-boiling range oil.

It is known that the activity of hydrodenitrification catalyst declines with time during use at a rate dependent upon the temperature and pressure conditions employed, with the rate of catalyst deactivation being particularly dependent on hydrogen partial pressure. It is desirable to carry out the hydrodenitrification process for many thousands of hours continuously without catalyst regeneration. U.S.P. 2,983,676 is directed to a split feed hydrodenitrification process wherein the catalyst fouling rate is reduced by processing the heavier oil fraction of a hydrocarbon feedstock separate from the lighter fraction. However, U.S.P. 2,983,676 does not disclose the relative space velocities and temperatures of the hydrodenitrification zones used to process the heavy and light fractions of the hydrocarbon feedstock other than to state that ordinarily the same temperatures are preferred. The present invention is directed to a particular method of split feed hydrodenitrification so as to achieve catalyst life before regeneration of over 4,000 hours, and, particularly, 7,000 or 8,000 hours, and more, while obtaining a hydrodenitrification product with a very low nitrogen content.

SUMMARY OF THE INVENTION

According to the present invention, in a process for hydrodenitrification of a hydrocarbon feed containing at least 500 p.p.m. organic nitrogen compounds on a nitrogen weight basis, wherein the hydrocarbon feed is separated into at least a light fraction and a heavy fraction and the light fraction is hydrodenitrified in a heavy conversion zone, each hydrodenitrification being affected by contacting the respective fraction with a catalyst containing Group VI and/or Group VIII metals or metal compounds in the presence of 100 to 20,000 s.c.f. of hydrogen per barrel of the respective fraction fed to the conversion zone, and at an LHSV between 0.1 and 10.0, a temperature between 500° and 900°0 F., a pressure above 200 p.s.i.g., the improvement is made which comprises:

a. maintaining the LHSV in the heavy conversion zone at less than 75 percent of the LHSV in the light conversion zone;

b. maintaining the inlet temperature in the heavy conversion zone at least 25° F. below the inlet temperature in the light conversion zone; and c. reducing the organic nitrogen content to an average of less than 50 p.p.m. on a nitrogen weight basis for the light and heavy hydrodenitrified fractions.

The process of the present invention is advantageous in that usually it allows onstream times before catalyst regeneration of over 4,000 hours and generally more than 7,000 hours, at an LHSV of about 0.5 to 1.0 for the heavy conversion zone and 1.5 to 2.0 for the light conversion zone, while reducing the nitrogen to below 50 p.p.m. on a blended basis. The process is particularly advantageous when reducing the nitrogen content to an average of below 5 p.p.m., as for example, 0.1 to 1.5 p.p.m. nitrogen.

Preferably, the feed to the heavy conversion zone boils mostly above about 550° F. and the feed to the light conversion zone boils mostly between about 380° and 550° F. Thus the present invention is directed primarily to the processing of feedstocks which boil above the naphtha boiling range, that is, above about 380° F.

It is still more preferred, according to the process of the present invention, to process in the heavy conversion zone a fraction boiling mostly above 600° F. and to process in the light conversion zone a fraction which boils mostly between 380° and 600° F.

In the present specification the boiling points which are mentioned are normal boiling points, that is, boiling points at atmospheric pressure. Also, the term "most," or "mostly," is used in the present specification to mean at least 50 percent of the specified materials boils within the specified range, and, usually, the term "most" connotes that about 80 to 95 percent of the material boils within the specified range. It is generally understood that a fraction boiling, for example, between about 380° and 550° F. (or a fraction having fractionation cut points of 380° F. and 550° F.) will usually contain a small amount of material boiling somewhat below 380° F. and a small amount of material boiling somewhat above 550° F.

Usually, the heavier fraction processed in the heavy conversion zone will have an ASTM end point below about 1,100° or 1,000° F., as, for example, an ASTM end point of about about 850° or 900° F. However, the process of the present invention may also be applied to heavy fractions such as residual fractions, or fractions which have end points of 1,300° F. and above. Because the process of the present invention is primarily directed to reducing the nitrogen content of the light and heavy fractions to a very low value, as, for example, less than 1 p.p.m. nitrogen on a blended basis, the process of the present invention is usually restricted to feeds having an upper cut point of about 950° F., or less.

Preferably the LHSV in the heavy conversion zone is less than 60 percent, and still more preferably less than 50 percent, of the LHSV in the light conversion zone. For example, LHSV of between about 0.4 and 1.2 is preferably used in the heavy zone, and an LHSV between about 1.4 and 2.2 is preferably used in the light conversion zone.

It is critical to the process of the present invention that the temperature employed in the heavy conversion zone be maintained at least 25° F. below the temperature employed in the light conversion zone. The combination of a relatively low temperature in the heavy conversion zone and a relatively low space velocity in the heavy conversion zone, as compared to the light conversion zone, has been found to result in long catalyst life for hydrodenitrification while obtaining a high degree of nitrogen removal from feedstocks boiling between about 400° and 900° F. Preferably, the temperature in the heavy conversion zone is maintained 35° to 45° F. below the temperature in the light conversion zone. For purposes of convenience, generally the temperature which is referred to in the present specification is the inlet feed temperature to the respective catalytic hydrodenitrification reaction zone. However, this inlet temperature is directly proportional to the average temperature in the catalytic hydrodenitrification zone. The average temperature will be somewhat higher than the inlet temperature, because the hydroconversion reactions which take place are exothermic reactions.

DISCUSSION OF EXAMPLE

The feeds processed according to this example were a light fraction boiling between about 400° and 850° F. and a heavy fraction boiling from about 500° to 850° F. but mostly (more than 90 volume percent) boiling above 600° E. The light fraction consisted of 52.6 volume percent 850° F. end-point coker gas oil; 9.62 volume percent 850° F. end-point staight-run gas oil; 20.6 volume percent light cycle oil; and 4.1 volume percent 735° F. end-point middle cycle oil for a total of 86.9 volume percent light fraction. The heavy fraction consisted of 13.1 volume percent 850° F. end-point heavy cycle oil. All the cycle oils were derived from a catalytic cracking unit. The heavy fraction was more refractory than the light fraction, because it was derived entirely from a catalytic cracking unit, and because it was heavier than the light fraction. The gravity of the heavy fraction was about 11.6 °API, and the light fraction was about 21.2 °API. Both fractions contained about 3,700 p.p.m. nitrogen.

It was desired to hydrodenitrify the above fractions so as to obtain a product with a nitrogen content of about 0.4 p.p.m. on a blended basis. It was found to be relatively unattractive to process the above fractions in one reactor for reasons including those discussed in the prior art, as, for example, U.S.P. 3,306,845 and U.S.P. 3,365,391. The disclosures of these two patents and the other patents cited above under prior art are incorporated by reference in their entireties into the present patent application.

The invention which is the subject of the present patent application resides in the particular manner in which the split-feed hydrodenitrification of a light and heavy oil is accomplished. According to the present invention the split-feed operation is carried out at specified lower temperature and space velocity for the heavy conversion zone relative to the light conversion zone, while reducing the average nitrogen content to below 50 p.p.m. generally to between 0.1 to 1.5 p.p.m. nitrogen.

In this example, 4 reactors were used to hydrodenitrify the light and heavy fractions down to 0.4 p.p.m. nitrogen on a blended or average basis. Because only two feedstocks are involved in the present example, two reaction zones (instead of four reactors) could have been used. The heavy fraction was processed through reactor No. 1 and the light fraction was processed through reactor No. 1 and the light fraction was processed through reactors Nos. 2, 3, and 4.

The laboratory data and calculations gave the following results for processing the two fractions at the space velocity as indicated in table 1 below:

TABLE 1

| Space velocity (LHSV) | | Inlet¹ temperature (° F.) | | Product nitrogen (p.p.m.) | | | Catalyst life to 800° F. (hr.) | |
|---|---|---|---|---|---|---|---|---|
| Heavy fraction (HF) | Light fraction (LF) | HF | LF | HF | LF | Average | HF | LF |
| 0.78 | 1.74 | 721 | 760 | 0.4 | 0.4 | 0.4 | 2,310 | 16,300 |
| 0.78 | 1.74 | 716 | 762 | 1.06 | 0.3 | 0.4 | 7,300 | 11,800 |
| 0.78 | 1.74 | 713 | 764 | 1.73 | 0.2 | 0.4 | 13,600 | 8,850 |
| 0.78 | 1.74 | 711 | 767 | 2.39 | 0.1 | 0.4 | 19,800 | 5,950 |

¹ At 0 hours on stream—fresh catalyst.

The hydrogen partial pressure which was used in both the heavy and light conversion zones was 2,150 p.s.i.a. Thus it can be seen that a higher hydrogen partial pressure was not used in the heavy conversion zone in order to obtain a lower fouling rate and longer catalyst life in the heavy conversion zone. The amount of hydrogen used for the heavy and light conversion zones was 7,200 s.c.f. per barrel of feed. The catalyst life tabulated in table 1 above is the calculated duration of time which the catalyst is onstream before it is necessary to raise the inlet temperature to 800° F. in order to reduce the product nitrogen content to the value specified in the respective columns for product nitrogen content. 800° F. was thus chosen as an arbitrary point to measure catalyst life. When the temperature was required to be raised as high as 800° F., the catalyst was judged to be fouled to the extent that it would require being taken off stream for regeneration.

A number of catalysts containing Group VI and/or Group VIII metals or metal compounds can be employed in the process of the present invention. In this example the particular catalyst used consisted of sulfides of nickel and tungsten in a matrix of alumina, silica and titania.

The results as summarized in table 1 above illustrate that a catalyst life of over 8,000 hours, that is, over one year's operating time, is obtained by operating at an LHSV of about 0.78 for the heavy fraction vs. 1.74 for the light fraction, and an inlet temperature for the heavy fraction about 45° F. less than the inlet temperature for the light fraction, while reducing the nitrogen content from over 1,000 p.p.m. (viz, 3,700 p.p.m.) down to less than 1 p.p.m. (viz,0.4 p.p.m. on a blended, or average basis.

Although various embodiments of the invention have been described, it is to be understood they are meant to be illustrative only and not limiting. Certain features may be changed without departing from the spirit or essence of the invention. It is apparent that the present invention has broad application to the (viz, 0.4 p.p.m.) hydrodenitrification of nitrogen contaminated hydrocarbon feedstocks. Accordingly, the invention is not to be construed as limited to the specific embodiments or examples discussed but only as defined in the appended claims.

I claim:

1. In a process for hydrodenitrification of a hydrocarbon feed containing at least 500 p.p.m. organic nitrogen compounds on a nitrogen weight basis, wherein the hydrocarbon feed is separated into at least a light fraction and a heavy fraction and the light fraction is hydrodenitrified in a light conversion zone, and the heavy fraction is hydrodenitrified in a heavy conversion zone, each hydrodenitrification being affected by contacting the respective fraction with a catalyst containing Group VI and/or Group VIII metals or metal compounds in the presence of 100 to 20,000 of hydrogen per barrel of the respective fraction fed to the conversion zone, and at a LHSV between 0.1 and 10.0, a temperature between 500° and 900° F., and a pressure above 200 p.s.i.g., the improvement which comprises:

a. feeding a heavy fraction boiling above 550° F. to the heavy conversion zone and a light fraction of which at least 80 to 95 percent boils between 380° and 550° F. to the light conversion zone:

b. maintaining the LHSV in the heavy conversion zone at less than 75 percent of the LHSV in the light conversion zone;

c. maintaining the inlet temperature to the heavy conversion zone and the average temperature in the heavy conversion reaction zone at least 25° F. below the inlet temperature and the average reaction zone temperature in the light conversion zone;

d. reducing the organic nitrogen content to an average of less than 50 p.p.m. on a nitrogen weight basis for the light and heavy hydrodenitrified fractions; and e. blending the hydrodenitrified fractions.

2. Process in accordance with claim 1 wherein most of the heavy fraction boils above 600° F.

3. A process in accordance with claim 2 wherein the LHSV in the heavy conversion zone is less than 60 percent of the LHSV in the light conversion zone.

4. A process in accordance with claim 1 wherein the hydrocarbon feed boils between about 400° and 1,000° F., contains between 100 and 30,000 p.p.m. organic nitrogen compounds on a nitrogen weight basis, and is separated into a light fraction boiling mostly below 550° F., and a heavy fraction boiling mostly above 550° F., and wherein the LHSV and inlet temperature of the heavy conversion zone are maintained between 0.4 and 1.2 and 650° and 750° F., respectively, and the LHSV and inlet temperature in the light conversion zone are maintained between 1.4 and 2.2 and 750° and 850° F., respectively, and wherein the inlet temperature of the heavy conversion zone is at least 35° F. below the inlet temperature of the light conversion zone.

5. A process in accordance with claim 4 wherein the organic nitrogen content is reduced to an average of less than 1 p.p.m. on a nitrogen weight basis for the light and heavy hydrodenitrified fraction.

* * * * *